3,058,973
POLYMERIZATION OF OLEFINS
Richard H. Greenwell, Wilmington, Del., assignor to Hercules Powder Company, Wilmington, Del., a corporation of Delaware
No Drawing. Filed June 7, 1960, Ser. No. 34,379
5 Claims. (Cl. 260—94.9)

This invention relates to an improved process for the polymerization of ethylenically unsaturated hydrocarbons under relatively mild conditions of pressure and temperature and, more particularly, to a method of controlling the polymer ash content.

In Belgian Patent No. 546,846 there is described a process of polymerizing ethylenically unsaturated hydrocarbons under mild conditions of temperature and pressure by using a two-component catalyst system comprising (1) the hydrocarbon-insoluble reaction product separated from the hydrocarbon-soluble products of the reaction of a compound of a metal of group IV–B, V–B, VI–B or VIII of the periodic table or manganese with an organometallic compound of an alkali metal, alkaline earth metal, zinc or earth metal and (2) an organometallic compound of an alkali metal, alkaline earth metal, zinc or earth metal.

An improved process of polymerizing ethylenically unsaturated hydrocarbons that is useful with the above-mentioned two-component catalyst system is described in Belgian Patent No. 549,910. In accordance with the latter Belgian patent, the molecular weight of the polymers can be controlled within a desired range by the addition of a specified amount of hydrogen to the polymerization system. It has been found, however, that when hydrogen is used in a process wherein the first component of the catalyst is a hydrocarbon-insoluble reaction product obtained from titanium tetrachloride, the ash content of the polymer is higher than when no hydrogen is used.

It has now been discovered that pretreating the hydrocarbon-insoluble reaction product component of the catalyst with hydrogen unexpectedly results in a polymer of lower ash content when the catalyst is used to polymerize an ethylenically unsaturated hydrocarbon in the presence of hydrogen.

Accordingly, this invention relates to an improvement in the process for the polymerization of ethylenically unsaturated hydrocarbons wherein at least one ethylenically unsaturated hydrocarbon is contacted with a two-component catalyst composition comprising (1) the hydrocarbon-insoluble reaction product separated from the hydrocarbon-soluble products of the reaction of titanium tetrachloride with an organometallic compound of a metal selected from the group consisting of alkali metals, alkaline earth metals, zinc and earth metals, and (2) an organometallic compound of a metal selected from the group consisting of alkali metals, alkaline earth metals, zinc and earth metals, in the presence of hydrogen, said improvement comprising the step of pretreating the hydrocarbon-insoluble reaction product component of the catalyst with hydrogen before combining with the second catalyst component.

Before describing the invention in greater detail, the following examples are presented for purposes of illustration, parts and percentages being by weight unless otherwise specified. The molecular weight of the polymers is indicated by the reduced specific viscosity (RSV). By the term "reduced specific viscosity" is meant the specific viscosity measured at 135° C. on a solution containing 0.1 gram of the polymer in 100 ml. of decahydronaphthalene divided by the concentration (0.1%) of the solution.

The hydrocarbon-insoluble reaction product component of the catalysts used in the following examples was prepared by reacting titanium tetrachloride with aluminum sesquichloride in a molar ratio of 1:1.1 in a diluent at 0° C. for 12 hours followed by a heat treatment for 4 hours at 85–90° C. The hydrocarbon-insoluble reaction product was isolated and then reslurried with sufficient diluent to prepare a suspension 0.543 M with respect to titanium. This suspension was separated into two portions. One portion was pretreated by evacuating the vessel in which it was contained, pressuring to 30 p.s.i.a. with hydrogen and agitating for 1 hour at 80° C.

*Examples 1 and 2*

Two polymerization vessels were each charged with 350 parts of mixed saturated aliphatic hydrocarbons (boiling range 170–200° C.) and flushed with nitrogen. Then to each vessel was added 1.09 parts of diethylaluminum chloride as a 1.84 M solution in heptane. To one vessel was added 0.69 part of the hydrocarbon-insoluble reaction product as the above 0.543 M suspension which had been treated with hydrogen, and to the other vessel was added 0.69 part of the untreated hydrocarbon-insoluble reaction product. Each vessel was evacuated and then charged with ethylene. After polymerizing for 4 hours at a constant pressure of 15 p.s.i.g. at a temperature of 80° C., the addition of ethylene was stopped and the reaction mixture stirred for 0.5 hour at a temperature of 80° C. Each vessel was evacuated and flushed with nitrogen and then 14.5 parts of butanol were added to destroy the catalyst. The poly(ethylene) produced in each example was purified by washing with a 4% sodium hydroxide solution containing a small amount of gluconic acid and then washing with water until neutral. It was then filtered and the filter cake steam distilled in the presence of dilute sodium hydroxide and a small amount of anti-foaming agent to further remove any remaining hydrocarbon diluent. The poly(ethylene) was filtered, again washed with water until neutral, and then dried at 80° C. under vacuum.

The results of the polymerizations are tabulated below:

| Example No. | Catalyst | Grams of Poly (ethylene) per liter of diluent | RSV | Wt. Percent Ash | Polymer Annealed Density, g./ml. |
|---|---|---|---|---|---|
| 1 | untreated | 207 | 4.5 | 0.06 | 0.964 |
| 2 | treated with H₂ | 196 | 4.5 | 0.06 | 0.962 |

It can be seen from the above examples that polymer ash content is low when hydrogen is not added during the polymerization regardless of whether the catalyst component is treated with hydrogen, and that polymers of relatively high molecular weights are obtained.

*Examples 3 and 4*

Two polymerizations of ethylene were conducted as in Examples 1 and 2 except that the feed gas consisted of 99.6% ethylene and 0.4% hydrogen by volume. The poly(ethylene) produced in each example was purified as described in Examples 1 and 2.

The results of the polymerizations are tabulated below:

| Example No. | Catalyst | Grams of Poly (ethylene) per liter of diluent | RSV | Wt. Percent Ash | Polymer Annealed Density, g./ml. |
|---|---|---|---|---|---|
| 3 | untreated | 166 | 1.7 | 0.23 | 0.968 |
| 4 | treated with H₂ | 194 | 1.9 | 0.10 | 0.968 |

Example 3 shows that the presence of hydrogen during the polymerization acts as a chain transfer agent to control the molecular weight of the polymer but simultaneously increases the polymer ash content. Example 4 shows that by pretreating the hydrocarbon-insoluble reaction product component of the catalyst with hydrogen, the polymerization can be conducted in the presence of hydrogen to produce a polymer of lower ash content.

*Examples 5 and 6*

Two polymerizations of ethylene were conducted as in Examples 1 and 2 except that the gas space of each polymerization vessel contained 50% hydrogen and 50% ethylene by volume at the start of the polymerization. The poly(ethylene) produced in each example was purified as described in Examples 1 and 2.

The results of the polymerizations are tabulated below:

| Example No. | Catalyst | Grams of Poly (ethylene) per liter of diluent | RSV | Wt. Percent Ash | Polymer Annealed Density, g./ml. |
|---|---|---|---|---|---|
| 5 | untreated | 105 | 1.6 | 0.37 | 0.972 |
| 6 | treated with $H_2$ | 154 | 1.3 | 0.10 | 0.961 |

Example 5 shows an alternate method of controlling the molecular weight of the polymer by providing hydrogen in the polymerization vessel at the beginning of the reaction instead of adding it during the reaction via the ethylene feed. Example 6 shows that the pretreatment according to this invention reduced the polymer ash content about threefold.

The invention is, of course, characterized by the pretreatment of one component of the specified catalyst with hydrogen. Apart from this, the process conditions and other variables are well known and within the skill of the art. For the sake of completion, however, a summary of the known art is included herein in addition to a description of the novel feature of the invention.

Any ethylenically unsaturated hydrocarbon or mixtures thereof can be polymerized by the process of this invention as, for example, hydrocarbons containing vinyl or vinylene groups. The invention is of particular importance for the polymerization of monoethylenically unsaturated hydrocarbons wherein the unsaturated group is a vinyl group, which compounds have the general formula $CH_2=CHR$ where R is hydrogen, a linear alkyl, a branched chain alkyl, cycloalkyl, aryl, aralkyl, or alkaryl, and for the polymerization of polyethlenically unsaturated hydrocarbons such as conjugated diolefins. Exemplary of the ethylenically unsaturated hydrocarbons which can be polymerized are the linear 1-olefins such as ethylene, propylene, butene-1, hexene-1, heptene-1, octene-1, octadecene-1, dodecene-1, etc., and branched chain 1-olefins and other olefins such as 4- and 5-methylheptenes-1, and substituted derivatives thereof such as styrene, vinylcyclohexane, diolefins such as hexadiene-1,4, 6-methylheptadiene-1,5 and conjugated diolefins such as butadiene, isoprene, pentadiene-1,3, cyclic olefins such as cyclopentadiene, cyclohexene, 4-vinylcyclohexene-1, β-pinene, etc.

The polymerization of the ethylenically unsaturated hydrocarbon can be carried out in a wide variety of ways. The process can be carried out as either a batch or continuous operation and with or without the use of an inert organic diluent as the reaction medium. With the more volatile monomers, a diluent is usually preferred. Any inert liquid organic solvent can be used as, for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated aromatic hydrocarbons such as chlorobenzenes, chloronaphthalenes, etc.

The selection of the temperature and pressure used for the polymerization process will depend upon the monomer, the activity of the catalyst system being used, the degree of polymerization desired, etc. In general, the polymerization will be carried out at a temperature within the range of from about −50° C. to about 150° C. and preferably from about −20° C. to about 100° C. In the same way, while atmospheric pressure or a pressure of only a few pounds can be used, the polymerization can be carried out over a wide range of pressures as, for example, from a partial vacuum to about 1000 p.s.i. and preferably from about atmospheric to about 500 p.s.i. pressure.

The polymerization of an ethylenically unsaturated hydrocarbon in accordance with this invention is conducted in the presence of hydrogen and a two-component catalyst system. One catalyst component is a hydrocarbon-insoluble reaction product separated from the hydrocarbon-soluble products of the reaction of titanium tetrachloride with an organometallic compound and subsequently treated with hydrogen. Exemplary of the organometallic compounds which can be reacted with titanium tetrachloride to produce the hydrocarbon-insoluble reaction product are the organoalkali metal compounds such as butyllithium, amylsodium, phenylsodium, etc., the organoalkaline earth metal compounds such as dimethylmagnesium, diethylmagnesium, butylmagnesium chloride, phenylmagnesium bromide, etc., the organozinc compounds such as diethylzinc, etc., and the organo earth metal compounds, especially the organoaluminum compounds such as triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds as, for example, sodium aluminum tetraethyl, lithium aluminum tetraethyl, lithium aluminum tetraoctyl, etc.

The reaction between the titanium tetrachloride and the organometallic compounds to provide the hydrocarbon-insoluble component of the catalyst can be carried out by mixing the two compounds in an inert diluent as, for example, aliphatic hydrocarbons such as hexane, heptane, etc., cycloaliphatic hydrocarbons such as cyclohexane or aromatic hydrocarbons such as benzene, toluene, xylene, etc., halogenated aromatic hydrocarbons such as chlorobenzenes, chloronaphthalenes, etc., or any mixture of such inert diluents. Any concentration of the two reagents can be used that is convenient. Another method that can be used in preparing the hydrocarbon-insoluble catalyst component is to simply mix the two reagents, i.e., without the use of a diluent. In this case, after the reaction is substantially complete, the hydrocarbon-insoluble reaction product will be isolated by extraction of the mixture with an inert solvent. The reaction of the two compounds can be carried out at any temperature and will generally be determined by the solvent, if used, the activity of the reactants, etc. For example, some metal alkyls might react at low temperatures whereas others would require elevated temperatures. Usually the reaction is conveniently carried out at room temperature or slightly elevated temperatures, but a temperature of from about −50° C. to about 150° C. can be used.

In preparing the hydrocarbon-insoluble component of the catalyst, the mole ratio of the two reactants can likewise be varied over a wide range. It is believed that a reduction of the titanium tetrachloride from the higher valence state of the titanium metal to one or more lower valence states takes place. Hence, there should be used the amount of the organometallic compound that will produce the desired amount of reduction. Thus, larger ratios of organometallic compound to the titanium tetrachloride are required for alkali metal alkyls than for a trialkylaluminum and in the same way, more of an alkylaluminum dihalide than a dialkylaluminum monohalide. In general, the molar ratio of organometallic compound to titanium tetrachloride will be from about 0.1:1 to 100:1 and more usually will be from about 0.3:1 to 10:1.

These hydrocarbon-insoluble catalyst components can be separated from the reaction mixture as soon as the reaction is substantially complete and then used in the polymerization. However, the activity of the component is in some cases further enhanced by allowing it to age before use. If an inert diluent is used in carrying out the reaction, the insoluble reaction product can be separated from the diluent and the soluble reaction by-products by simply allowing the mixture to settle, centrifuging, etc., and decanting the supernatant liquid, or they can be separated by filtration, etc. If the reaction was carried out in the absence of a diluent, the hydrocarbon-insoluble reaction product can be separated by extracting the reaction mixture with an inert hydrocarbon diluent so as to remove the hydrocarbon-soluble by-products.

To obtain a low polymer ash content, in accordance with this invention, the hydrocarbon-insoluble catalyst component is treated with hydrogen before being mixed with the second component of the catalyst. The conditions under which this treatment is carried out can vary over a wide range. However, in general, the hydrocarbon-insoluble component is exposed to at least 15 p.s.i.a. of hydrogen. The time and temperature of the treatment are inversely related and conditions of from about 30° C. to about 120° C. for a period of from about 24 hours to about 10 minutes can be used.

As has already been pointed out, the process in accordance with this invention involves the use of a two-component catalyst system, one of which is the hydrocarbon-insoluble reaction product prepared as described above, and the other is an organometallic compound of a metal selected from the group of alkali metals, alkaline earth metals, zinc and earth metals, which compounds have already been exemplified above. This second catalyst component can be the same organometallic compound that was used in preparing the insoluble reaction product catalyst component or a different organometallic compound. Thus, when the polymerization is carried out in accordance with this invention, it is possible to use the less active but more readily prepared metal alkyls such as the aluminum sesquihalides for the preparation of the insoluble catalyst component and then in the polymerization process, use as the second catalyst component a metal alkyl such as diethylaluminum chloride and still have one of the most active polymerization catalysts. Obviously, this results in great overall economies.

The manner in which the two catalyst components are added to the polymerization system will depend upon the method by which the polymerization is carried out. They can be added all at once, in any order, or one or the other or both can be added in increments or continuously during the polymerization. Excellent results, and in some cases superior results, can be obtained by mixing the two catalyst components together, allowing the mixture to age for a short time and then adding the mixture all at one time, in increments, or continuously to the polymerization process. The two catalyst components that are combined for the polymerization will depend upon the monomer being polymerized, the desired degree of polymerization, etc.

By the addition of hydrogen to the above polymerization system, it is possible to control the molecular weight of the polymer produced. Thus by the addition of small amounts of hydrogen, it is possible to only slightly reduce the molecular weight and with larger amounts of hydrogen the molecular weight can be quite drastically reduced. The hydrogen can be added all at one time in the beginning of the polymerization or at some stage during the polymerization, or it can be added in increments during the polymerization process or continuously throughout the polymerization process. The amount of hydrogen added will, of course, depend upon the desired amount of reduction in the molecular weight of the polymer over that produced when no hydrogen is present, the catalyst used, monomer, temperature, etc. For example, propylene and the higher olefins are much more sensitive to the effects of hydrogen than is ethylene; hence, even very small amounts of hydrogen will effect a very great reduction of the molecular weight of polypropylene, whereas ten times or more that amount may be required to effect a comparable reduction in the molecular weight of polyethylene. In general, the amount of hydrogen added will be at least about 0.001 mole percent of the monomer or monomers present in the polymerization system and preferably will be from about 0.01 mole percent to about 99 mole percent and more preferably from about 0.1 mole percent to about 90 mole percent of the monomer content of the polymerization system. In some instances it is preferred to maintain a certain hydrogen pressure on the system and then, in the case of gaseous monomers such as ethylene, add the monomer at a somewhat higher total pressure. In such a system the lowest molecular weight will be obtained when the monomer pressure is small compared to the hydrogen pressure. Any hydrogen pressure can be used up to that at which extensive hydrogenation of the monomer occurs but preferably will not exceed about 200 p.s.i.a. In the case of gaseous monomers containing inert gases or where gaseous inerts are formed during the reaction, which inerts build up in the polymerization system as the monomer polymerizes and hence alter the concentrations, it may be desirable to maintain a constant monomer and hydrogen pressure (a greater total pressure) or to sparge out the inert gases from the system along with part or all of the hydrogen and then add fresh hydrogen. After the polymerization reaction is complete, the unreacted hydrogen can be recovered and re-used as such or after purification. Hydrogen or its ordinary isotopic mixtures can be used in accordance with this invention as, for example, hydrogen enriched in deuterium. Mixtures of hydrogen and inert gases such as nitrogen can also be used.

The process of this invention enables the improved polymerization of ethylenically unsaturated hydrocarbons in the presence of hydrogen without any impairment of the properties of the polymers produced and without any change in polymer purification methods being required.

What I claim and desire to protect by Letters Patent is:

1. In the process for the polymerization of an ethylenically unsaturated hydrocarbon wherein at least one ethylenically unsaturated hydrocarbon is contacted in the presence of hydrogen with a two-component catalyst composition comprising (1) the hydrocarbon-insoluble reaction product separated from the hydrocarbon-soluble products of the reaction of titanium tetrachloride with an organometallic compound of a metal selected from the group consisting of alkali metals, alkaline earth metals, zinc and earth metals, and (2) an organometallic compound of a metal selected from the group consisting of alkali metals, alkaline earth metals, zinc and earth metals the organo portion of each organometallic component comprising a hydrocarbon radical, the improvement comprising the step of pretreating the hydrocarbon-insoluble reaction product component of the catalyst with hydrogen at a pressure of at least 15 p.s.i.a. and a temperature of about 30 to 120° C. before combining with the second catalyst component.

2. The process of claim 1 wherein the ethylenically unsaturated hydrocarbon is ethylene.

3. The process of claim 1 wherein the hydrocarbon-insoluble reaction product is the hydrocarbon-insoluble reaction product separated from the hydrocarbon-soluble products of the reaction of titanium tetrachloride with aluminum sesquichloride.

4. The process of claim 1 wherein the organometallic compound of the second component of the catalyst is diethylaluminum chloride 5. In the process for the polymerization of ethylene wherein the ethylene is contacted in the presence of hydrogen with a two-component catalyst system composition comprising (1) the hydrocarbon insoluble reaction product separated from the reaction of titanium tetrachloride and aluminum sesquichloride and (2) diethylaluminum chloride, the improvement comprising the step of pretreating the hydrocarbon insoluble reaction product component of the catalyst with hydrogen at a pressure of at least 15 p.s.i.a. and a temperature of about 30 to 120° C.

References Cited in the file of this patent

FOREIGN PATENTS 549,910     Belgium ---------------- Aug. 14, 1956